Feb. 3, 1970 P. GUYOT 3,493,947

MULTIAPERTURE MAGNETIC MEMORY ELEMENT

Filed Nov. 28, 1967 2 Sheets-Sheet 2

United States Patent Office 3,493,947
Patented Feb. 3, 1970

3,493,947

MULTIAPERTURE MAGNETIC MEMORY ELEMENT

Paul Guyot, Paris, France, assignor to CSF-Compagnie Generale de Telegraphie Sans Fil, a corporation of France Filed Nov. 28, 1967, Ser. No. 686,103
Claims priority, application France, Dec. 16, 1966, 87,786
Int. Cl. G11b *5/00;* H01f *27/42*
U.S. Cl. 340—174 3 Claims

ABSTRACT OF THE DISCLOSURE

A flat magnetic element for memory or logical circuits having a rectangular hysteresis loop, comprises a core portion around a part of which is wound a send winding and in another part of which is formed a hole defining therein two arms of unequal width. The wider arm carries a receive winding. Two legs extend from said core. Around these legs are wound an input winding and an output winding, the winding about one leg being in opposite direction with respect to the winding about the other leg. A magnetic path closes the circuit between the legs and the core.

The present invention relates to magnetic memory elements, more particularly of the so called "guided flux" type.

For the manufacture of memory or logical circuits there are often used shielded elements, i.e. such elements that the magnetic flux created by the field due to the currents flowing through the windings is closed within them.

Such elements are generally formed in magnetic sheets, having a substantially rectangular hysteresis loop, for example by photoengraving.

It is an object of the invention to improve elements of this type as described by Newhall.

A magnetic memory element as devised by Newhall has an axial symmetry and comprises a main branch and two lateral branches closing the magnetic path. The main branch is in turn divided into two legs which are symmetrical with respect to the axis of the structure, and are called the "1" leg and the "0" leg.

An input and an output winding are wound about both legs, the winding about one leg being in a direction opposite to that about the other leg.

The input winding receives the information and the output winding passes it to the following element.

A core or "source of flux" is associated with the main branch or is a part thereof. This source comprises a main core portion around which is wound a "send" winding and which is, for example, in the prolongation of the above mentioned legs. When a send pulse flows through the send winding, it saturates both the "1" leg and the "0" leg, through which propagates the same flux of a predetermined direction.

The main core is extended in a direction opposite to that of the above legs by two arms having an equal section. One of these arms carries a receive winding. To this winding "receive" pulses are applied in the same time as input pulses are applied to the input winding. They have a plurality opposed to that of the "send" pulses.

The combined action of the "receive" and the input pulse result in reversing the flux direction in one of the legs, while this direction is preserved in the other. According to whether this reversal has taken place in one leg or the other, the 1 digit, or the 0 digit is stored in the element.

Such known elements have the advantage of being excited by two simultaneous pulses. The required level of the information pulse is therefore reduced and the number of cascade connected elements may be increased.

It is an object of the invention to improve such elements.

According to the invention, there is provided a flat magnetic circuit element having a rectangular hysteresis loop comprising a core portion carrying a send winding, a further core portion extending from said core portion and having a hole defining, in said further portion, two arms of unequal width, one of said arms carrying a receive winding, two legs extending from said core portion; an input and an output winding, wound on both said legs the direction of winding on one leg being opposite to that on the other leg and magnetic path means for closing the magnetic circuit between said legs and said core portion.

For a better understanding of the invention and to show how the same may be carried into effect, reference will be made to the drawing accompanying the following description and in which.

Figure 1:
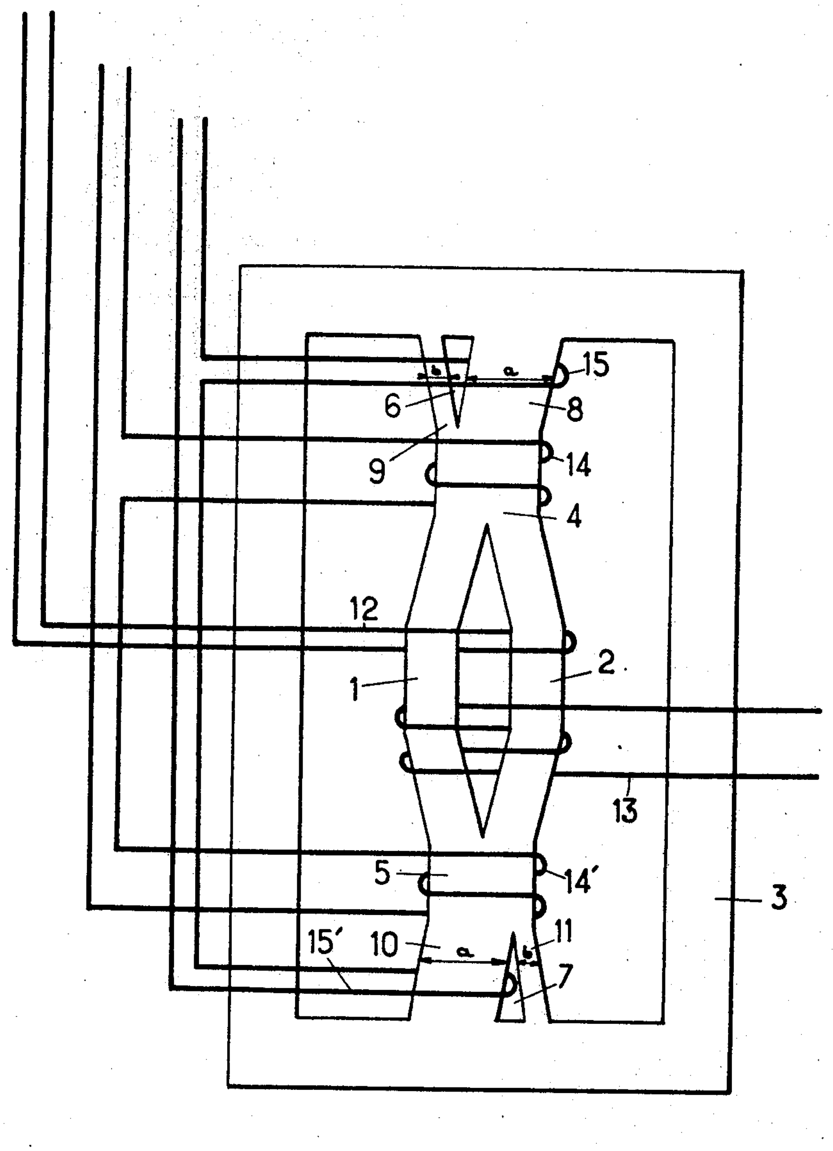
FIG. 1 shows a magnetic element according to the invention.

The magnetic element illustrated in FIG. 1 is made of an alloy having a hysteresis loop of substantially rectangular shape, e.g. an alloy of the Permalloy kind, having a thickness which is only a fraction of a mm. and having transversal dimensions of about 10 mm. It comprises a main branch forming two legs 1 and 2, providing two different paths for the magnetic flux coming from a core 4, which is a "flux source" also forming a part of the main branch.

The magnetic circuit is closed through lateral branches 3. The whole structure is symmetrical with respect to both the vertical and horizontal axes so that the "flux source" 4 is duplicated by a flux source 5. Holes 6 and 7 are formed in portions of cores 4 and 5 respectively, which portions are thus split into two arms 8, 9 and 10, 11 respectively. In accordance with the present invention, the holes 6 and 7 are so positioned that the arms have unequal widths, the wide arms 8 and 10 having a width *a*, and the narrow arms 9 and 11 a width *b*. The sum $a+b$ will preferably be equal to the sum of the width of the legs 1 and 2.

An input winding 12 is wound about the legs 1 and 2 in opposite directions. In the same way, an output winding 13 is wound about legs 1 and 2, in directions opposite to each other so that a reversal of the fluxes in legs 1 and 2 produces at the terminals 13 a positive or negative pulse according to the direction of the fluxes prior to their reversal. Winding 13 has several turns, for example two as illustrated.

Two send windings 14 and 14', connected in series and surrounding the cores 4 and 5 respectively, are provided. The purpose of these windings has already been indicated above. Also receive-windings 15 and 15', whose general purpose has also already been indicated are provided.

A send pulse is first applied. When a receive pulse is applied to windings 15–15', it causes the flux in the arms 8 and 10 to be reversed. According to the invention, the reversed flux portion is greater than 50% of the total flux in the cores 9 and 5. Preferably this portion is comprised between 55 and 95%.

If the receive pulse and the input pulse are applied simultaneously, the fluxes in legs 1 and 2 are in mutually opposite directions. These directions have two possible orientations depending upon whether the input pulse is positive or negative. These two possible states correspond respectively to the digits 0 and 1 of the binary code.

The above operation has been tested by the applicants in a shift register, in which the elements according to the invention were used, and compared with that of a shift register using known elements as described by Newhall, i.e. in which the holes 6 and 7 are symmetrical with respect to the axis of the arms 4 and 5.

In both cases, the mineral amplitude of the input signal compatible with a correct operation of the shift register has been measured. Experience has shown that, other things being equal, this amplitude was divided by a factor G, equal to about 3, for $$\frac{a}{a+b}=0.85$$

Figure 2:
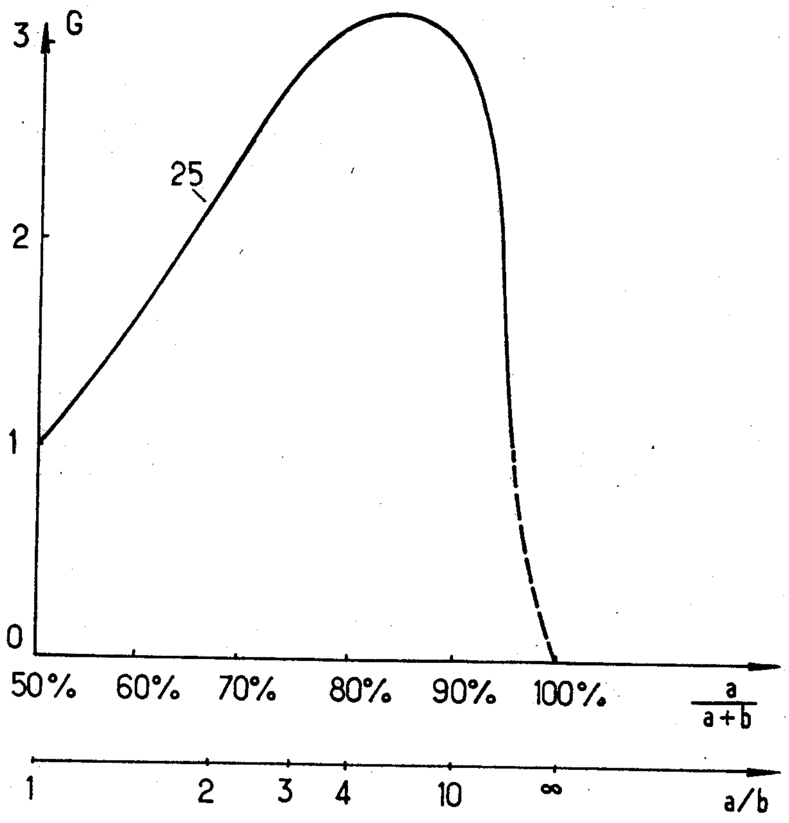
FIG. 2 is an explanatory curve.

The measurements were effected with elements according to the invention in which the respective with $a$ and $b$ of arms 6 and 8 were progressively varied. The curve 25 of FIG. 2 which was thus plotted shows, for a given material, the factor G as a function of $a/b$ and $$\frac{a}{a+b}$$

It will be seen that starting from 1.2 for $$\frac{a}{a+b}=0.55$$

G increases rapidly to reach a maximum equal to 3 for $$\frac{a}{a+b}=0.80$$

whereafter the curve drops off and at around $$\frac{a}{a+b}=0.95$$

G is again lower than 1.2. Thus, the ratio $a/b$ should be between 3 and 11.5, corresponding to $$\frac{a}{a+b}$$

equal to between 0.75 and 0.92. Needless to say, these figures relate to a particular material and particular operating conditions.

Of course, the invention is not limited to the embodiments described and shown which were given solely by way of example.

What is claimed is:

1. A flat magnetic circuit element having a rectangular hysteresis loop comprising a core portion carrying a send winding, a further core portion extending from said core portion and having a hole defining, in said further portion, two arms of unequal width, one of said arms carrying a receive winding, two legs extending from said core portions; an input and an output winding wound on both said legs, the direction of winding on one leg being opposite to that on the other leg and magnetic path means for closing the magnetic circuit between said legs and said core portion.

2. A circuit as claimed in claim 1, wherein the sum of the respective widths of said legs is equal to the width of said core.

3. A circuit as claimed in claim 2, wherein the ratio of the width of said arm carrying said receive winding to said sum is comprised between .55 and .95.

References Cited

UNITED STATES PATENTS

| | | | |
|---|---|---|---|
| 3,293,621 | 12/1966 | Newhall | 340—174 |
| 3,293,625 | 12/1966 | Mina | 340—174 |
| 3,294,979 | 12/1966 | Newhall | 307—88 |
| 3,376,562 | 4/1968 | Newhall et al. | 340—174 |
| 3,407,307 | 10/1968 | Minnick | 307—88 |

OTHER REFERENCES

IEEE Transactions on Communications & Electronics, "The Use of Balanced Magnetic Circuits to Construct Digital Controllers" by Newhall, No. 70–75, pp. 837–842, November 1964.

STANLEY M. URYNOWICZ, Jr., Primary Examiner

U.S. Cl. X.R.

307—88